US012762428B2

(12) United States Patent
Chellapandi et al.

(10) Patent No.: US 12,762,428 B2
(45) Date of Patent: Oct. 13, 2026

(54) FEDERATED LEARNING FOR CONTROLS AND MONITORING OF FUNCTIONS IN VEHICULAR SETTINGS

(71) Applicant: Cummins Inc., Columbus, IN (US)

(72) Inventors: Vishnu Pandi Chellapandi, Columbus, IN (US); Hoseinali Borhan, Bloomington, IN (US); Joshua Edward Supplee, Plain City, OH (US)

(73) Assignee: Cummins Inc., Columbus, IN (US)

( * ) Notice: Subject to any disclaimer, the term of this patent is extended or adjusted under 35 U.S.C. 154(b) by 79 days.

(21) Appl. No.: 18/825,975

(22) Filed: Sep. 5, 2024

(65) Prior Publication Data

US 2025/0100569 A1 Mar. 27, 2025

Related U.S. Application Data

(60) Provisional application No. 63/540,866, filed on Sep. 27, 2023.

(51) Int. Cl.
*G06N 3/098* (2023.01)
*B60W 10/06* (2006.01)
(Continued)

(52) U.S. Cl.
CPC ......... *G06N 3/098* (2023.01); *G05B 13/0265* (2013.01); *G06N 20/00* (2019.01);
(Continued)

(58) Field of Classification Search
CPC ......... G06N 3/098; G06N 20/00; G06N 3/045; G06N 3/0985; B60W 10/06; B60W 10/08;
(Continued)

(56) References Cited

U.S. PATENT DOCUMENTS

| | | | |
|---|---|---|---|
| 9,564,757 | B2 | 2/2017 | Wang et al. |
| 10,414,410 | B2 | 9/2019 | Vijayakumar |

(Continued)

FOREIGN PATENT DOCUMENTS

| | | | |
|---|---|---|---|
| CN | 111456860 B | 7/2020 | |
| EP | 4 246 379 A1 | 9/2023 | |

(Continued)

OTHER PUBLICATIONS

Zhang, H., et al., "End-to-End Federated Learning for Autonomous Driving Vehicles," 2021, IEEE, 2021 International Joint Conference on Neural Networks (IJCNN) (Year: 2021).*

(Continued)

*Primary Examiner* — Abby Lin
*Assistant Examiner* — Karston G. Evans
(74) *Attorney, Agent, or Firm* — Foley & Lardner LLP

(57) ABSTRACT

Presented herein are systems and methods for performing federated learning across vehicles. A computing device having one or more processors coupled with memory can maintain, on the memory, a first machine learning (ML) comprising a first plurality of parameters for determining values identifying a characteristic of a vehicle function on at least one of a plurality of vehicles. The computing device can receive a second plurality of parameters generated by a second ML used by each respective vehicle. The computing device can update the first plurality of parameters of the first ML in accordance with the second plurality of parameters received from each respective vehicle of the plurality of vehicles. The computing device can transmit, to a vehicle, the updated first plurality of parameters to update the second plurality of parameters of the second ML on the vehicle.

18 Claims, 8 Drawing Sheets

(51) Int. Cl.

| | |
|---|---|
| ***B60W 10/08*** | (2006.01) |
| ***B60W 10/30*** | (2006.01) |
| ***B60W 50/02*** | (2012.01) |
| ***G05B 13/02*** | (2006.01) |
| ***G06N 20/00*** | (2019.01) |
| *B60W 50/00* | (2006.01) |
| *G06N 3/045* | (2023.01) |
| *G07C 5/08* | (2006.01) |

(52) U.S. Cl.
CPC ............. *B60W 10/06* (2013.01); *B60W 10/08* (2013.01); *B60W 10/30* (2013.01); *B60W 2050/0088* (2013.01); *B60W 50/0205* (2013.01); *B60W 2556/45* (2020.02); *G06N 3/045* (2023.01); *G07C 5/0808* (2013.01)

(58) Field of Classification Search
CPC .. B60W 10/30; B60W 20/10; B60W 50/0205; B60W 50/06; B60W 20/11; B60W 2050/0088; B60W 2050/046; B60W 2556/05; B60W 2556/45; F01N 3/2066; G05B 13/0265; G07C 5/0808; B60R 16/023
See application file for complete search history.

(56) References Cited

U.S. PATENT DOCUMENTS

| | | | | |
|---|---|---|---|---|
| 10,803,213 | B2 | 10/2020 | Bhattacharyya et al. | |
| 10,968,855 | B2 | 4/2021 | Kitagawa et al. | |
| 11,130,409 | B1 | 9/2021 | Bonny et al. | |
| 2020/0151611 | A1 | 5/2020 | Mcgavran et al. | |
| 2021/0070336 | A1 | 3/2021 | Howard et al. | |
| 2021/0241138 | A1 | 8/2021 | Meroux et al. | |
| 2021/0312725 | A1* | 10/2021 | Milton .................. | G06N 3/098 |
| 2022/0035965 | A1 | 2/2022 | Liebman et al. | |
| 2022/0122011 | A1 | 4/2022 | Islam et al. | |
| 2022/0138626 | A1 | 5/2022 | Bi | |
| 2022/0250656 | A1 | 8/2022 | Ucar et al. | |
| 2022/0374764 | A1* | 11/2022 | Gurumurthy .......... | G06N 3/092 |
| 2023/0269766 | A1 | 8/2023 | Guo et al. | |
| 2023/0297845 | A1* | 9/2023 | Gyllenhammar .... | G06N 3/0895 717/168 |
| 2024/0174254 | A1* | 5/2024 | Chen ..................... | G06F 18/214 |
| 2024/0256892 | A1* | 8/2024 | Kawana ................. | G06N 20/00 |
| 2024/0265296 | A1* | 8/2024 | Gao ....................... | G06N 20/00 |
| 2024/0394556 | A1* | 11/2024 | Shao .................... | G06N 3/0985 |

FOREIGN PATENT DOCUMENTS

| | | | |
|---|---|---|---|
| WO | WO-2017/024217 | A2 | 2/2017 |
| WO | WO-2022/261192 | A1 | 12/2022 |

OTHER PUBLICATIONS

European Search Report for corresponding EP Patent Application No. 24202271.3, issued Mar. 7, 2025, 11 pages.

* cited by examiner

FEDERATED LEARNING FOR CONTROLS AND MONITORING OF FUNCTIONS IN VEHICULAR SETTINGS

CROSS REFERENCE TO RELATED APPLICATION

The present application claims the benefit of and priority to U.S. Provisional Patent Application No. 63/540,866, titled "Federated Learning for Controls and Monitoring of Functions in Vehicular Settings," filed Sep. 27, 2023, which is incorporated herein by reference in its entirety.

TECHNICAL FIELD

The present disclosure relates to inter-vehicular communications. More particularly, the present disclosure relates to systems and methods for federated learning for controls and monitoring of functions in vehicular settings.

BACKGROUND

A vehicle can include a controller to manage various vehicle functions. The controller on the vehicle can use sensor data in handling and carrying out the functions.

SUMMARY

At least one aspect of the present disclosure relates to a system for performing federated learning across vehicles. A first computing device having one or more processors coupled with memory can maintain, in the memory, a first machine learning (ML) comprising a first plurality of parameters for determining values identifying a characteristic of a vehicle function on at least one of a plurality of vehicles. The first computing device can receive, from each respective vehicle of the plurality of vehicles, a second plurality of parameters generated by a second ML model used by a second computing device on each respective vehicle using (i) data associated with the vehicle function acquired via at least one sensor and (ii) a value identifying the characteristic of the vehicle function on the respective vehicle. The first computing device can update the first plurality of parameters of the first ML in accordance with the second plurality of parameters received from each respective vehicle of the plurality of vehicles. The first computing device can transmit, to at least one vehicle of the plurality of vehicles, the updated first plurality of parameters to update the second plurality of parameters of the second ML on the at least one vehicle.

In some embodiments, the first computing device can retrieve, responsive to establishing a connection with at least one vehicle of the plurality of vehicles, the second plurality of parameters of the second ML model on the at least one vehicle. The second plurality of parameters can be generated on the at least one vehicle while no connection was established with the first computing device. In some embodiments, the first computing device can initialize the first ML model using a third plurality of parameters generated by a third ML model maintained on at least one server. In some embodiments, the first computing device can identify, from a plurality of ML models, the first ML model based on the vehicle function. In some embodiments, the first computing device can transmit, to the at least one vehicle of the plurality of vehicles, an identifier corresponding the vehicle function and the updated first plurality of parameters of the first ML model to update the second ML model on the at least one vehicle.

In some embodiments, the first computing device can generate an output using the first ML model that identifies a vehicle function action. The first computing device can cause, in accordance with the output, one or more components associated with the vehicle function action to execute the vehicle function action. In some embodiments, the vehicle function can include at least one of: a battery management function to control output from a battery, a dosing control function of an aftertreatment system to control an injection of reductant in the aftertreatment system, an engine control function, a hybrid control function to control a switching between electric motor and fuel-based engine, an advanced drive assistance system function to control operation of vehicle movement, a vehicle diagnostic function to detect faults in the vehicle, or a vehicle prognostic function to predict faults in the vehicle.

Another aspect of the present disclosure relates to a vehicle system. The vehicle system can include a component to perform a vehicle system function. The vehicle system can include at least one processing circuit including one or more processors coupled with memory. The at least one processing circuit can maintain a first machine learning (ML) model comprising a first plurality of parameters for determining values associated with the vehicle system function. The at least one processing circuit can identify data associated with the vehicle system function and a first value identifying a characteristic of the vehicle system function. The at least one processing circuit can generate a second value identifying the characteristic of the vehicle system function using the first ML model. The at least one processing circuit can update the first plurality of parameters of the first ML model based on a comparison between the first value and the second value. The at least one processing circuit can transmit the first plurality of parameters from the ML model to at least one computing device remote from the at least one processing circuit to update a second ML model.

In some embodiments, the at least one processing circuit can receive, from the at least one computing device, a second plurality of parameters of the second ML model. The second plurality of parameters can be generated by the at least one computing device using the first plurality of parameters and a third plurality of parameters received from each respective vehicle system of a plurality of vehicle systems. In some embodiments, the at least one processing circuit can identify, from a plurality of ML models, the first ML model based on the vehicle system function. In some embodiments, the at least one processing circuit can update the first plurality of parameters of the first ML model using the third plurality of parameters.

In some embodiments, the at least one processing circuit can transmit compressed data regarding the first plurality of parameters to the at least one computing device in response to establishment of a connection with the at least one computing device. In some embodiments, the at least one processing circuit can initialize the first ML model using a second plurality of parameters received from the second ML model of the at least one computing device remote from the at least one processing circuit. In some embodiments, the at least one computing device can beat least one server. The at least one processing circuit can transmit the first plurality of parameters to the at least one server to update a third ML model on the at least one server using the first plurality of parameters and a second plurality of parameters from each respective vehicle system of a plurality of vehicle systems.

In some embodiments, the at least one computing device can be an on-board vehicle computing device. The at least one processing circuit can transmit the first plurality of parameters to the on-board vehicle computing device to update the second ML model using the first plurality of parameters. In some embodiments, the at least one processing circuit can generate an output using the first ML model that identifies a vehicle function action. The at least one processing circuit can cause, in accordance with the output, one or more components associated with the vehicle function action to execute the vehicle function action.

At least one aspect of the present disclosure relates to a method of performing federated learning across vehicles. The method can include: maintaining, by a first computing system, a first machine learning (ML) model comprising a first plurality of parameters for determining values associated with a vehicle function of at least one of a plurality of vehicles; receiving, by the first computing system and from each respective vehicle of the plurality of vehicles, a second plurality of parameters generated by a second ML model used by a second computing system on each respective vehicle; updating, by the first computing system, the first plurality of parameters of the first ML model in accordance with the second plurality of parameters received from each respective vehicle of the plurality of vehicles; and transmitting, by the first computing system and to at least one vehicle of the plurality of vehicles, the updated first plurality of parameters to cause a second computing system on the at least one vehicle to update the second plurality of parameters of the second ML model on the at least one vehicle.

In some embodiments, the method can include: receiving the second plurality of parameters further comprises retrieving, by the first computing system and responsive to establishing a connection with at least one vehicle of the plurality of vehicles, the second plurality of parameters of the second ML model on the at least one vehicle. The second plurality of parameters can be generated on the at least one vehicle while no connection was established with the first computing system. In some embodiments, the method can include initializing, by the first computing system, the first ML model using a third plurality of parameters generated by a third ML model maintained on at least one server.

In some embodiments, the method can include identifying, by the first computing system, the first ML model from a plurality of ML models based on the vehicle function. In some embodiments, the method can include transmitting, by the first computing system and to the at least one vehicle, an identifier corresponding to the vehicle function and the updated first plurality of parameters of the first ML model. In some embodiments, the method can include generating, by the first computing system, an output using the first ML model that identifies a vehicle function action; and causing, by the first computing system, in accordance with the output, one or more components associated with the vehicle function action to execute the vehicle function action.

These and other features, together with the organization and manner of operation thereof, will become apparent from the following detailed description when taken in conjunction with the accompanying drawings. Numerous specific details are provided to impart a thorough understanding of embodiments of the subject matter of the present disclosure. The described features of the subject matter of the present disclosure can be combined in any suitable manner in one or more embodiments and/or implementations. In this regard, one or more features of an aspect of the invention can be combined with one or more features of a different aspect of the invention. Moreover, additional features can be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements unless otherwise indicated, in which.

DETAILED DESCRIPTION

Figure 1:
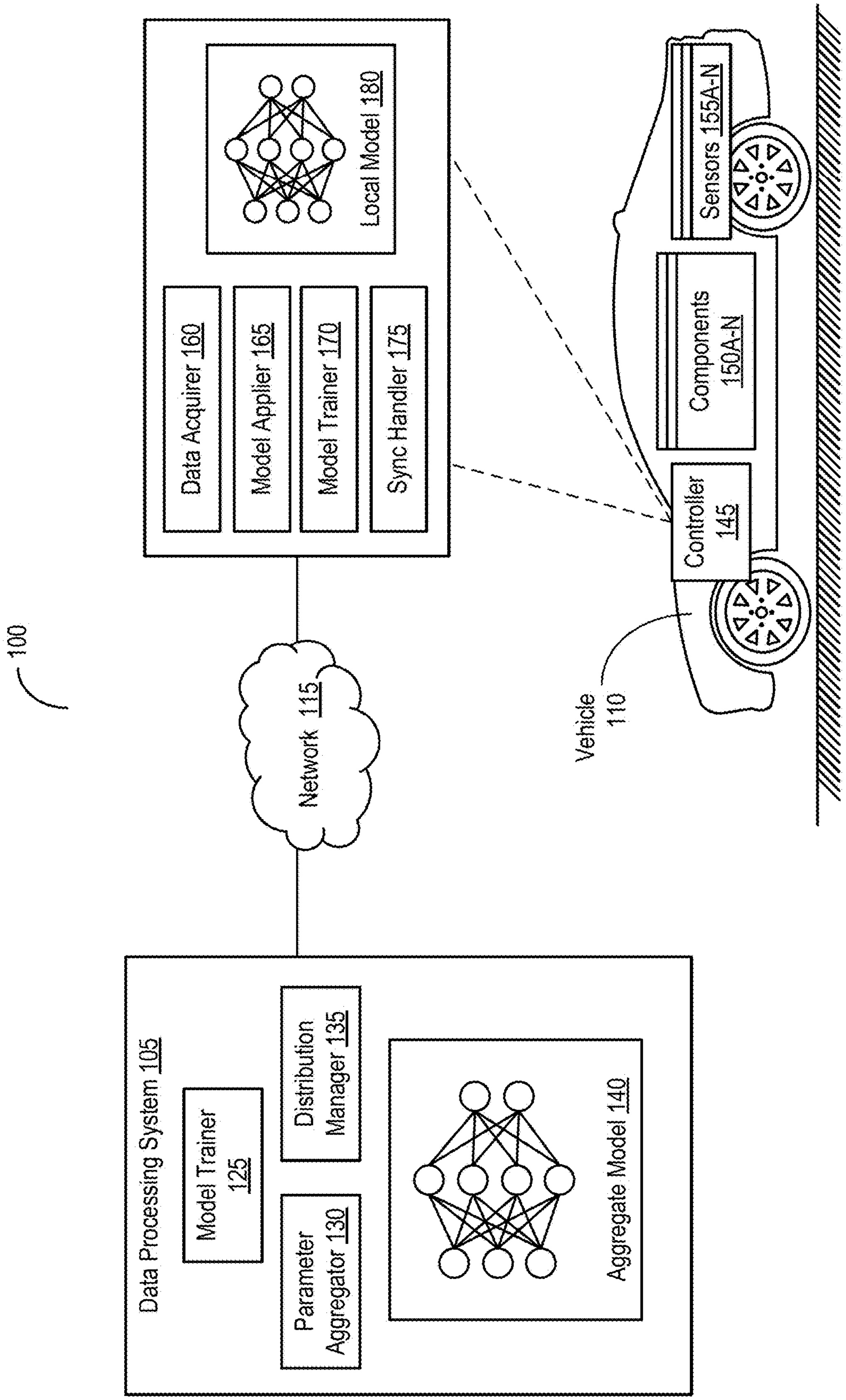
FIG. 1 depicts a block diagram of a system for performing federated learning across vehicles, in accordance with an illustrative embodiment.

Following below are more detailed descriptions of various concepts related to, and implementations of, methods, devices, apparatuses, and systems for performing federated learning across vehicles. The various concepts introduced above and discussed in greater detail below may be implemented in any number of ways, as the concepts described are not limited to any particular manner of implementation. Examples of specific implementations and applications are provided primarily for illustrative purposes.

A controller (e.g., an electronic control module (ECM)) in a vehicle may use measured data acquired via sensors on the vehicle to generate command signals for controlling various vehicle functions, such as battery control, engine control, engine emission, autonomous vehicle functions, vehicle diagnostics, and prognostics, among others. To facilitate the generation of command signals from the measured data, the controller may use machine learning (ML) models in processing the measured sensor data. The controller on board the vehicle, however, may have limited processing power and memory space. Due to this constraint, the on-board controller may be unable to individually handle establishment, training, and the updating of the ML model by itself. Furthermore, even for controllers built with additional processing power and memory space, there may be not enough sensor data accumulated by the sensors on the vehicle for the controller to adequately update the weights of the ML model. This issue may be particularly problematic for input-sensitive ML models, where small changes in the values of the input data can result in large swings in the output values. As a result, once the ML models are deployed on the vehicle, it may be difficult for the controller to adapt or correct the ML model to the newly received sensor data on the vehicle. Reliance on such an ML model may result in the generation of incorrect or inaccurate outputs for controlling the vehicle components, thereby degrading the vehicle functionality.

To address these and other technical challenges, federated learning may be used to facilitate the aggregation and distribution of model parameters learned from training ML models across a multitude of vehicles. The federated learning may be centralized or decentralized. Under centralized federated learning, a server with much more processing power and memory than the controller(s) on-board vehicles can maintain a global instance of a ML model. The server can send model parameters from the global ML model to the vehicle controller to initialize and establish a local instance of the ML model on each individual vehicle. With the establishment, the controller on each individual vehicle may use data received from on-board sensors to generate command signals to control various function as well as update the parameters of the ML model. The centralized server may aggregate model parameters and measurement data from the multitude of vehicle controllers to use in updating the global instance of the ML model. With the updating of the global instance, the server may send the model parameters from the global instance to the vehicles to update the local instances of the ML model.

Under decentralized federal learning, the controllers on the vehicles may exchange model parameters and measurement data with one another to update the ML models, without the involvement of a centralized server. On each vehicle, the controller may be configured with a local instance of the ML model (e.g., from installation). The controller may use data received from on-board sensors to generate command signals to control various function and update the parameters of the ML model. To update, the controller on one vehicle may communicate with the controller on another vehicle to exchange model parameters from the local instance of the ML model between one another. The controller may aggregate the model parameters from other vehicles, and may update the local instance of the ML model (e.g., using a light-weight method such as averaging).

In this manner, federated learning can facilitate the aggregation and distribution of parameters learned from training the instances of the ML models (e.g., global or local instances). The use of federated learning can account for the processor and memory constraints of any individual vehicle on-board controller, by leveraging the processor and memory capacity across multiple vehicle controllers or servers. Furthermore, the model parameters exchanged among the vehicles and the servers may embed features derived from sensor measurement data, thereby addressing the issue with individual controllers not accumulating sufficient amount of data to properly train and update the local instance of ML model. By using federated learning (centralized or decentralized), the controller on each vehicle may properly train and update the local instance of the ML model. The better trained and updated ML model may be used by the vehicle controller to generate proper outputs for controller vehicle components and functions. These and other features and benefits are described more fully herein below.

Referring now to FIG. 1, depicted is a block diagram of an environment or a system 100 for performing federated learning across vehicles. The system 100 can include at least one data processing system 105 and one or more vehicles 110. The data processing system 105 (sometimes referred herein as a computing device) and the vehicle 110 can be communicatively coupled via at least one network 115. The data processing system 105 can include at least one model trainer 125, at least one parameter aggregator 130, at least one distribution manager 135, and at least one aggregate model 140, among others. The vehicle 110 can have at least one controller 145 (sometimes also referred herein a computing device), one or more components 150A-N (hereinafter generally referred to as components 150), and one or more sensors 155A-N (hereinafter generally referred to as sensors 155), among others. The controller 145 (sometimes referred herein as an electronic control unit (ECU), electronic control module (ECM), or an edge device) can include at least one data acquirer 160, at least one model applier 165, at least one model trainer 170, at least one synchronization handler 175, and at least one local model 180, among others. In some embodiments, the system 100 may include the data processing system 105 to carry out centralized federated learning. In some embodiments, the system 100 may lack the data processing system 105 to perform decentralized learning, the functionalities ascribed to the data processing system 105 can be performed by the controller 145 at each vehicle 110.

The vehicle 110 may be any type of vehicle, such as an automobile (e.g., a sedan as depicted, a truck, a bus, or a van), a motorcycle, an airplane, a helicopter, a locomotive, or a watercraft, among others. In some embodiments, the vehicle 110 may be an internal combustion engine vehicle with a fuel source such as gasoline, hydrogen (e.g., a hydrogen internal combustion engine), diesel, natural gas (e.g., liquified natural gas (LNG), ethanol, or biodiesel, among others, or any combination thereon. Thus, the engine may be a spark-ignited internal combustion or a compression-ignition engine. The vehicle 110 may be an electric vehicle (EV) powered by an internal electrical energy source (e.g., a battery pack) or a hybrid vehicle powered by both an internal combustion engine and the internal electrical energy source, among others. The vehicle 110 may be, for example, a plug-in electric vehicle (EV, electric car, etc.), battery electric vehicle (BEV), fuel cell electric vehicle (FCEV), hybrid electric vehicle (HEV), plug-in hybrid electric vehicle (PHEV), range-extended electric vehicle (REEV), extended-range electric vehicle (E-REV), range-extended battery-electric vehicle (BEVx), or other vehicle powered by or otherwise operable via at least one of a battery, generator (e.g., a power generator, generator plant, electric power strip, on-board rechargeable electricity storage system, etc.), an engine, and a motor, among others.

The vehicle 110 can include house, contain, or otherwise include the one or more components 150. The components 150 may control, handle, or provide various functions for the vehicle 110. The vehicle functions can be associated with, for example, a battery management function to control battery output, a dosing control function control an injection of reductant in the aftertreatment system, an engine control function on an engine system to control vehicle motor, a hybrid control function to switch between electric motor and fuel-based engine, an advanced drive assistance system function to control operations of vehicle movement, a vehicle diagnostic function to detect faults in the vehicle, or a vehicle prognostic function to predict faults in the vehicle, among others. For example, for the engine electronics, the components 150 can include a motor-generator coupled to or disposed in a power train, drive shaft, axle housing, or wheels, among others, of the vehicle 110. The components 150 can include mechanical components or accessory to the vehicle engine, such as a radiator fan, air compressor, fuel pump, water pump, power steering pumps, and air conditioning system, among others. The components 150 may be electrically or communicatively coupled with one another and other parts of the vehicle 110.

The vehicle 110 can house, contain, or otherwise include the at least one controller 145. The controller 145 may be communicatively coupled with various components in the vehicle 110, such as an internal combustion engine, an electric motor, an exhaust aftertreatment system, a power train, a transmission control unit, among others. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections.

The vehicle 110 can house, contain, or otherwise include one or more sensors 155. The sensors 155 can instrument, measure, or otherwise acquire any type of data on the vehicle 110 or any one or more of the components 150. For example, the sensors 155 can include: a speed sensor to measure vehicle speed; an oxygen sensor to instrument amount of oxygen in vehicle; an emission sensor to instrument amount of gasses (e.g., nitrogen oxide (NOx), carbon dioxide (CO2), hydrocarbons, and particular matter (PM)) emitted by the engine in the vehicle; a throttle position sensor; a crankshaft position sensor; a camshaft sensor; a fuel pressure sensor; a power sensor; a mass air flow sensor; a fuel temperature sensor; and a manifold absolute pressor sensor, among others. Upon acquisition and generation, the sensors 155 can relay, convey, or otherwise provide the acquired data to the controller 145 and components 150 for additional processing.

Components of the system 100, such as the data processing system 105 and the vehicle 110 (e.g., the controller 145, the components 150, and the sensors 155) can be implemented using circuitry, such as one or more processors coupled with memory. The circuitry can include logic or machine-readable instructions (e.g., as embodied in the model trainer 125, the parameter aggregator 130, the distribution manager 135, and the aggregate model 140 on the data processing system 105, or the data acquirer 160, the model applier 165, the model trainer 170, and the synchronization handler 157 of the controller 145, on the memory) to define the behavior, functions, and operations of the circuitry. The functions attributed or defined by the machine-readable instructions can be attributable to the circuitry overall. The circuitry can be implemented by computer readable media which can include code written in any programming language, including, but not limited to, Java, JavaScript, Python or the like and any conventional procedural programming languages, such as the "C" programming language or similar programming languages. The machine-readable instructions can be stored and maintained on memory. The circuitry can include one or more processors to execute the machine-readable instructions. The one or more processors can be coupled with the memory to execute the machine-readable instructions therefrom.

The processor can be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution.

The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be communicably connected to the processor to provide computer code or instructions to the processor for executing at least some of the processes described herein. Moreover, the memory may be or include tangible, non-transient volatile memory or non-volatile memory. Accordingly, the memory may include database components, object code components, script components, or any other type of information structure for supporting the various activities and information structures described herein.

The network 115 can be a local area network that supports communication between the data processing system 105 and one or more vehicle 110. The network 115 can be a wide area network (WAN) to facilitate data communication capability between the data processing system 105 and one or more vehicle 110, such as the Internet. Technologies can be used, including wired (e.g., Ethernet, IEEE 802.3 standards) and/or wireless technologies (e.g., Wi-Fi, IEEE 802.11 standards). The network 115 can be established in accordance an inter-vehicle (V2X) communications protocol between the data processing system 105 and the one or more vehicles 110.

The data processing system 105 can be any computing device comprising one or more processors coupled with memory and software and capable of performing the various processes and tasks described herein. The data processing system 105 may be in communication with the vehicle 110, when a connection is established via the network 115. The data processing system 105 may be situated, located, or otherwise associated with at least one server group. The server group may correspond to a data center, a branch office, or a site at which one or more servers corresponding to the data processing system 105 is situated.

On the data processing system 105, the model trainer 125 can initialize, establish, and train the aggregate model 140 using training data and other data, such as parameters from instances of the local model 180 on each vehicle 110. The parameter aggregator 130 can retrieve parameters from instances of the local model 180 on each of the vehicles 110.

The distribution manager 135 can provide parameters from the aggregate model 140 to update parameters in instances of the local model 180 on each of the vehicles 110. The aggregate model 140 (sometimes herein referred to as a global model) can be a machine learning (ML) model or an artificial intelligence (AI) algorithm, such as a clustering algorithm (e.g., k-nearest neighbors algorithm, hierarchical clustering, distribution-based clustering), a regression model (e.g., linear regression or logistic regression), support vector machine (SVM), Bayesian model, or an artificial neural network (e.g., convolution neural network (CNN), a generative adversarial network (GAN), recurrent neural network (RNN), or a transformer), among others.

In general, the aggregate model 140 can have a set of inputs and a set of outputs related to one another via one or more, and particularly a set, of parameters (sometimes herein referred to as weights). In other words, the "parameter(s)" are one or more values that are applied to the input(s) to enable, determine, specify, etc. generation of the output(s) from the input(s). The aggregate model 140 can be applied to input data to generate output values associated with various vehicle functions. In some embodiments, the aggregate model 140 and by extension local model 180 can be associated with a particular vehicle function. For instance, the data processing system 105 may maintain multiple aggregate models 140, with one model for processing emission systems data and another model for processing engine performance data. Likewise, the controller 145 on the vehicle 110 can maintain multiple local models 180, with one model for processing emission systems data and another model for processing engine performance data. Each aggregate model 140 on the data processing system 105 may be associated with an instance of a corresponding local model 180 on the vehicle 110.

The controller 145 can be any computing device on the vehicle 110 comprising one or more processors coupled with memory and software and capable of performing the various processes and tasks described herein. The controller 145 can be in communication with other vehicles 110 as well as the data processing system 105, when a connection is established via the network 115. On the controller 145, the data acquirer 160 can retrieve data from the sensors 155 associated with a vehicle function. The model applier 165 can apply the acquired data to the local model 180 to generate one or more output values regarding the vehicle function. The model trainer 170 can initialize, establish, and train the local model 180 using data acquired from the sensor 155 or the parameters from the data processing system 105 in accordance with federated learning techniques. The synchronization handler 175 can send parameters from the local model 180 to the data processing system 105 and receive parameters of the aggregate model 140 on the data processing system 105.

Continuing on, the local model 180 can be a machine learning (ML) model or an artificial intelligence (AI) algorithm, such as a clustering algorithm (e.g., k-nearest neighbors algorithm, hierarchical clustering, distribution-based clustering), a regression model (e.g., linear regression or logistic regression), support vector machine (SVM), Bayesian model, or an artificial neural network (e.g., convolution neural network (CNN), a generative adversarial network (GAN), recurrent neural network (RNN), or a transformer), among others. In general, the local model 180 can have a set of inputs and a set of outputs related to one another via a set of parameters. The local model 180 can be of the same type of ML model or AI algorithm as the aggregate model 140, and can be an instance of the aggregate model 140 on the controller 145 in the vehicle 110. The local model 180 can be applied to input data to generate output values associated with various vehicle functions.

Figure 2:
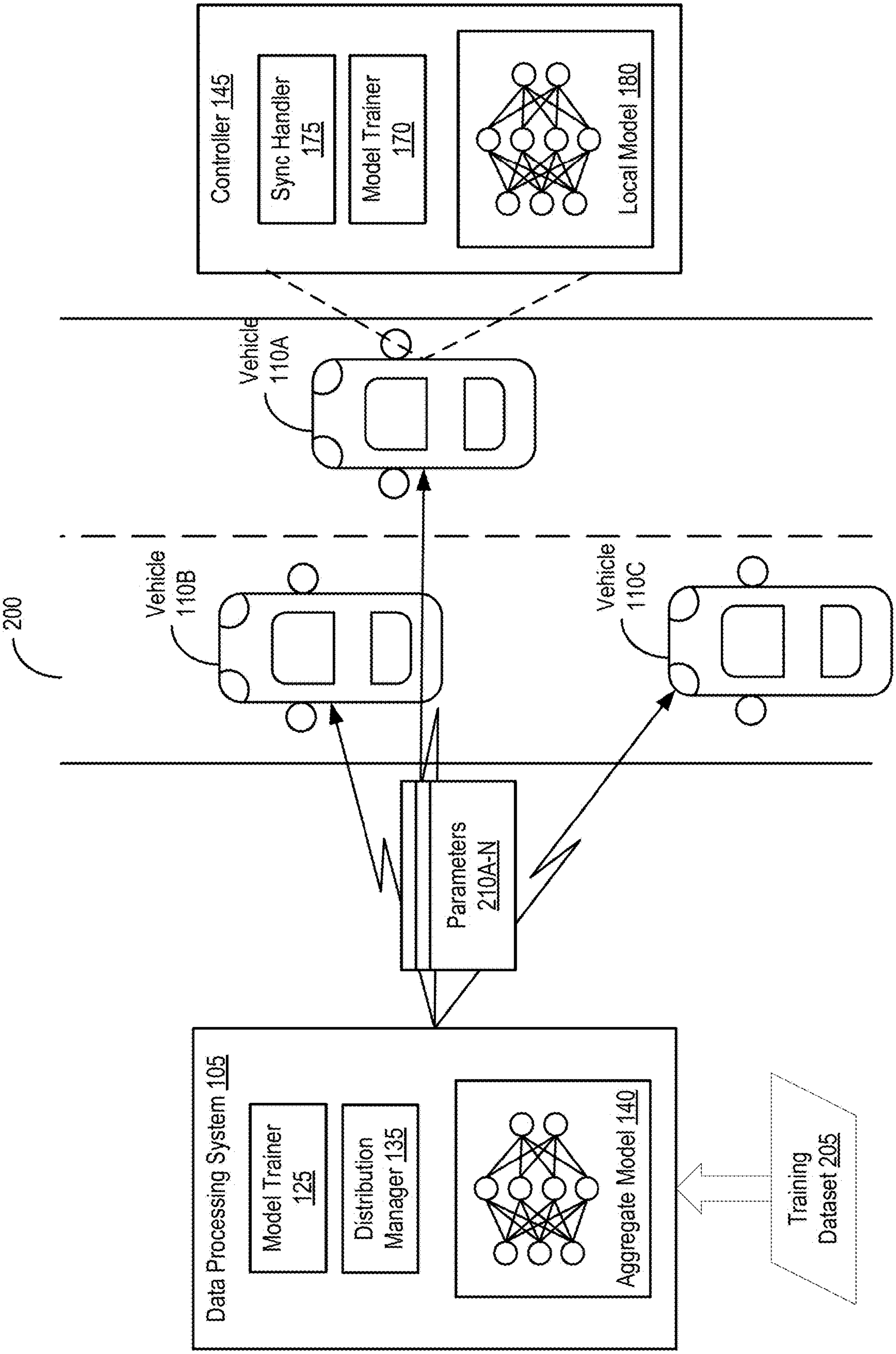
FIG. 2 depicts a block diagram of a process for initializing local models in the system for performing federated learning across vehicles, in accordance with an illustrative embodiment.

Referring now to FIG. 2 depicted is a block diagram of a process 200 for initializing local models in the system 100 for performing federated learning across vehicles. The process 200 can include or correspond to operations performed in the system 100 to initialize instances of models on the data processing system 105 or the vehicles 110. Under the process 200, the model trainer 125 on the data processing system 105 can initialize, establish, and maintain the aggregate model 140 using various data, such as at least one training dataset 205. The aggregate model 140 can include a set of parameters 210A-N (hereinafter generally referred to as parameters 210) to relate between at least one input and at least one output. In initializing, the model trainer 125 can configure, assign, or otherwise set initial values (e.g., random or defined values) to the parameters 210 in the aggregate model 140. The aggregate model 140 can be applied to an input dataset (e.g., sensor data) associated with a vehicle function to generate at least one output value identifying a characteristic of the vehicle function.

To train the aggregate model 140, the model trainer 125 can retrieve, receive, or otherwise identify the training dataset 205. The training dataset 205 can identify or include a set of examples for a particular vehicle function. Each example can identify or include a sample input dataset (e.g., sensor measurement data) and a measured output value identifying a characteristic associated with the vehicle function. For example, for the vehicle function of battery, the sample input dataset can include various measurements about the battery, such as a state of charge, an internal resistance, and temperature, among others, and the output value can be measured remaining useful life or age of the battery. For the vehicle function of emission system, the sample input dataset can include engine speed, engine load, and fuel quality, and the output value can be the measured amount of gas emissions (e.g., in the form of nitrogen oxide (NOx)). For the vehicle function of diesel oxidation catalyst (DOC) system, the sample input dataset can include temperature profile of the DOC, pressure profile, and concentration of various gases, among others, and the output value can indicate an efficiency rating for the DOC system. For the vehicle function of engine performance (e.g., duty cycle), the sample input dataset can include vehicle speed, terrain type (e.g., highway, local road, or offroad), engine temperature, and altitude, among others, and the output value can indicate a duty cycle (e.g., repetition of vehicle control signals over a period of time or distance), among others. In some embodiments, the sample input values may include the various measurements for the vehicle function and the sample output may include the output value identifying a command signal to be provided to the components associated with the vehicle function.

Continuing on, for the aftertreatment system, the sample input dataset can include emission levels of particulates, temperature, pressure differential, and regeneration frequency, among others, and the output value can identify measurement of aging of the aftertreatment system. For the advanced drive assistance systems (ADAS), the sample input dataset can include vehicle speed, vehicle acceleration, Light Detection and Ranging (LiDAR) data, and steering angle, among others, and the output value can include a command signal to be sent to the ADAS system to set or adjust operations. Any number of inputs and outputs can be used for the examples in the training dataset 205 for training the aggregate model 140.

With the identification of the training dataset 205, the model trainer 125 can feed or apply the input dataset for the vehicle function from each example to the aggregate model 140. In some embodiments, the model trainer 125 can identify or select the aggregate model 140 associated with the vehicle function from the set of aggregate models 140, based on the data included in the training dataset 205. For instance, when the training dataset 205 is for the vehicle function of the battery, the model trainer 125 can select the aggregate model 140 corresponding to the battery vehicle function. In applying, the model trainer 125 can process the input dataset for the vehicle function in accordance with the parameters 210 of the aggregate model 140. From processing, the model trainer 125 can output, produce, or otherwise generate at least one expected output value for the vehicle function. For instance, when the input dataset includes sensor data for emissions, the expected output generated by the aggregate model 140 can include an estimated number of emissions for particulates. Upon output, the model trainer 125 can compare the expected output value generated by the aggregate model 140 and the measured output value identified in the example from the training dataset 205.

Based on the comparison, the model trainer 125 can calculate, generate, or otherwise determine at least one error metric. The error metric can be calculated in accordance with any loss function, such as a root mean squared error, a relative root mean squared error, and a weighted cross entropy, among others. Using the error metric, the model trainer 125 can modify, set, or otherwise update one or more of the parameters 210 of the aggregate model 140. The updating can be in accordance with accordance with an optimization function (e.g., with a set learning rate, a momentum, weight decay, and momentum) for the aggregate model 140. The optimization function can include, for example, a stochastic gradient descent (SGD) or an adaptive learning rate method, among others. The model trainer 125 can iterate the updating of the parameters 210 of the aggregate model 140 until satisfying a convergence condition. The model trainer 125 can store and maintain the set of parameters 210 on the data processing system 105 (e.g., on memory or data storage). While described primarily herein in accordance with supervised learning techniques, weakly supervised or unsupervised learning techniques can be employed in training the aggregate model 140.

The distribution manager 135 on the data processing system 105 can provide, transmit, or otherwise send the set of parameters 210 to the controller 145 on each vehicle 110. The distribution manager 135 can send the set of parameters 210, together with an identification of the vehicle function for which the parameters 210 were generated. In some embodiments, the distribution manager 135 can broadcast the set of parameters 210 to the vehicles 110. For example, the distribution manager 135 can broadcast the set of parameters 210 in accordance with a schedule, such as at an hourly or weekly interval. In some embodiments, the distribution manager 135 can monitor for establishment of a connection between the controller 145 and the data processing system 105 over the network 115. Upon detecting the establishment of the connection, the distribution manager 135 can transmit the set of parameters 210 to the vehicle 110. For example, the distribution manager 135 can detecting the connection through a communication interface on the data processing system 105 with the controller 145 on the vehicle 110. In some embodiments, the set of parameters 210 can be transmitted among the vehicles 110 upon establishing a connection (e.g., using inter-vehicle (V2X) communications protocols). In some embodiments, the distribution manager 135 can send, provide, or transmit compressed data (e.g., quantization, sparsification, lossless compression, or lossy compression) regarding the set of parameters 210 to the vehicle 110 upon establish the connection.

The synchronization handler 175 of the controller 145 on the vehicle 110 can retrieve, identify, or otherwise receive the set of parameters 210 from the data processing system 105. In some embodiments, the synchronization handler 175 can monitor for an establishment of the connection with the data processing system 105. The synchronization handler 175 can attempt to connect with the data processing system 105 via the network 115 in accordance with a schedule, such as at an hourly, daily, or weekly interval. Upon detection of the establishment, the synchronization handler 175 can fetch or retrieve the set of parameters 210 from the data processing system 105. The synchronization handler 175 can also retrieve, identify, or otherwise receive the identification of the vehicle function for which the parameters 210 were generated. The distribution and receipt of the set of parameters 210 can be in accordance with federated learning techniques.

The model trainer 170 of the controller 145 on the vehicle 110 can initialize, establish, or otherwise configure the local model 180. The local model 180 can correspond to a localized instance of the aggregate model 140 for determining values of the same vehicle function. With receipt from the data processing system 105, the model trainer 170 can set the values of the parameters on the local model 180 to values identified by the set of parameters 210 of the aggregate model 140. In some embodiments, the model trainer 170 can identify the local model 180 associated with the identified vehicle function for which the set of parameters 210 were generated. For example, when the set of parameters 210 is for the vehicle function of the emission system, the model trainer 170 can select the local model 180 corresponding to the emission system from the set of local models 180 maintained on the controller 145. With the identification, the model trainer 170 can set or assign the values of the local model 180 with the values defined by the set of parameters 210 received from the data processing system 105.

Figure 3:
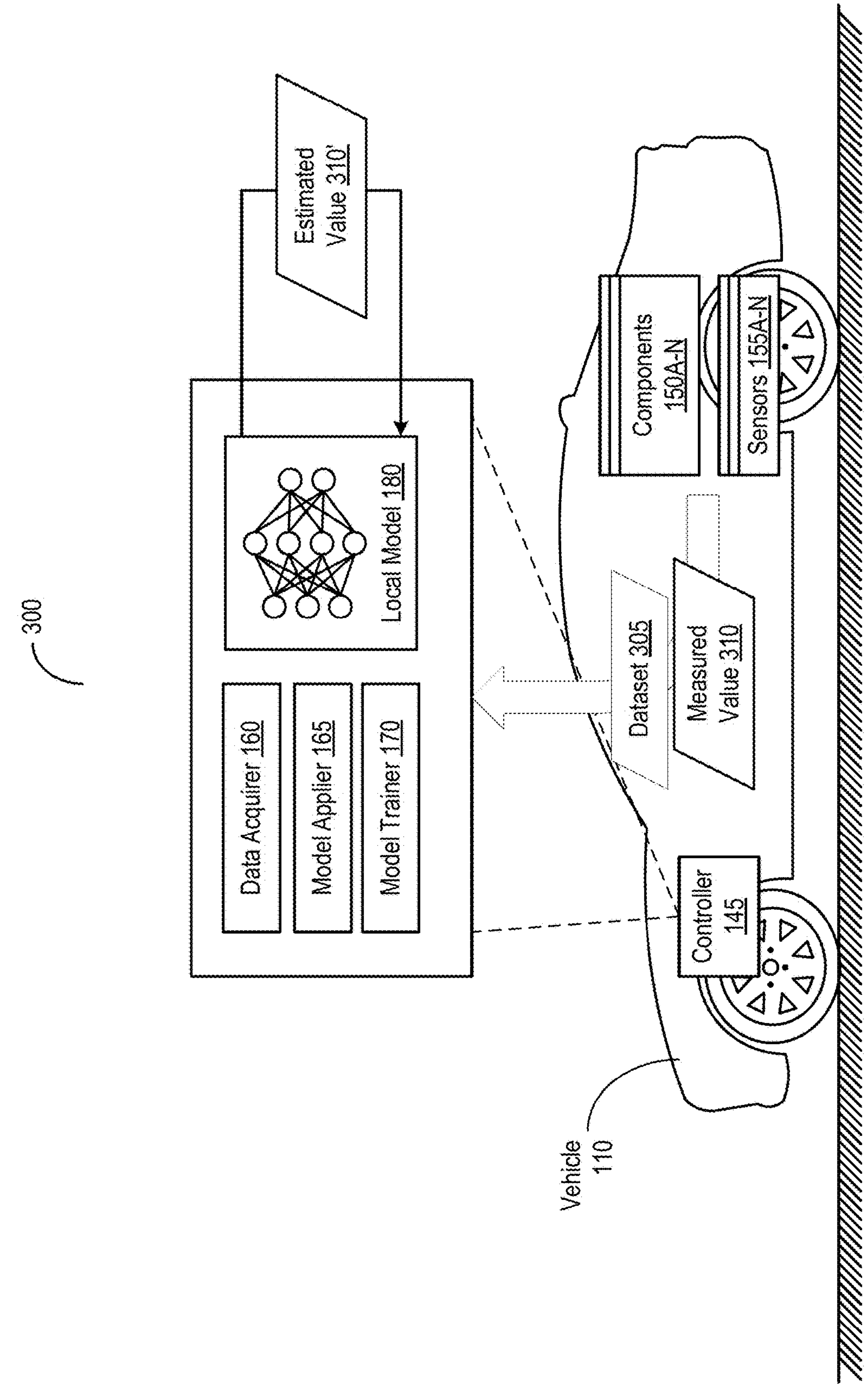
FIG. 3 depicts a block diagram of a process for training local models in the system for performing federated learning across vehicles, in accordance with an illustrative embodiment.

Referring now to FIG. 3, depicted is a block diagram of a process 300 for training local models in the system for performing federated learning across vehicles. The process 300 can include or correspond to operations in the system 100 to update the local model. Under the process 300, the data acquirer 160 of the controller 145 on the vehicle 110 can retrieve, receive, or otherwise identify at least one dataset 305 (sometimes herein referred to generally as data) from one or more sensors 155. The dataset 305 can include measurements for the vehicle function for which the local model 180 is to generated outputs. For example, when the vehicle function is for the emission system, the dataset 305 can identify engine speed, engine load, and fuel quality as acquired or generated by the sensors 155. In addition, the data acquirer 160 can retrieve, receive, or otherwise identify at least one measured value 310 for the vehicle function. The measured value 310 can define or identify a characteristic of the vehicle function. The characteristic may define output measurements from the components 150 associated with the vehicle function. In some embodiments, the data acquirer 160 can identify the measured value 310 from the components 150 associated with the vehicle function. Continuing on with the example, the measured value 310 for the components 150 corresponding the emissions system can include an amount of expelled nitrogen oxide (NOx) gas from the vehicle 110 as measured by the relevant sensor 155.

The dataset 305 and the measured value 310 can be used to train and refine the local model 180.

The model applier 165 of the controller 145 on the vehicle 110 can feed or apply the dataset 305 received from the sensors 155 to the local model 180. In some embodiments, the model applier 165 can identify the local model 180 associated with the vehicle function to which to feed the dataset 305. In some embodiments, the model applier 165 (and model trainer 170) can wait or delay the application of the dataset 305 until the processors on the controller 145 are idle or free from performing other operations for the vehicle 110. In applying, the model applier 165 can process the dataset 305 in accordance with the parameters of the local model 180. From processing, the model applier 165 can produce, output, or otherwise generate at least one estimated value 310' (sometimes herein referred to as expected or predicted value) for the vehicle function. The estimated value 310' can be of the same type of value for the vehicle function as the measured value 310. For instance, when the vehicle function is for the ADAS system, the measured value 310 and the estimated values 310' can include adjustments to be made to vehicle propulsion system factoring in the measurements identified in the dataset 305 acquired via the sensors 155.

The model trainer 170 of the controller 145 on the vehicle 110 can maintain the local model 180. With the output, the model trainer 170 compare the expected value 310' generated by the local model 180 and the measured output value identified in the example from the training dataset 205. Based on the comparison, the model trainer 170 can calculate, generate, or otherwise determine at least one error metric. The error metric can be calculated in accordance with any loss function, such as a root mean squared error, a relative root mean squared error, and a weighted cross entropy, among others. Using the error metric, the model trainer 170 can modify, set, or otherwise update one or more of the parameters of the local model 180. The updating can be in accordance with accordance with an optimization function (e.g., with a set learning rate, a momentum, weight decay, and momentum) for the local model 180. The optimization function can include, for example, a stochastic gradient descent (SGD) or an adaptive learning rate method, among others. The model trainer 170 can iterate the updating of the parameters of the local model 180 until satisfying a convergence condition. The model trainer 170 can store and maintain the parameters on the controller 145 (e.g., on the memory) While described primarily herein in accordance with supervised learning techniques, weakly supervised or unsupervised learning techniques can be employed in training the local model 180.

Figure 4:
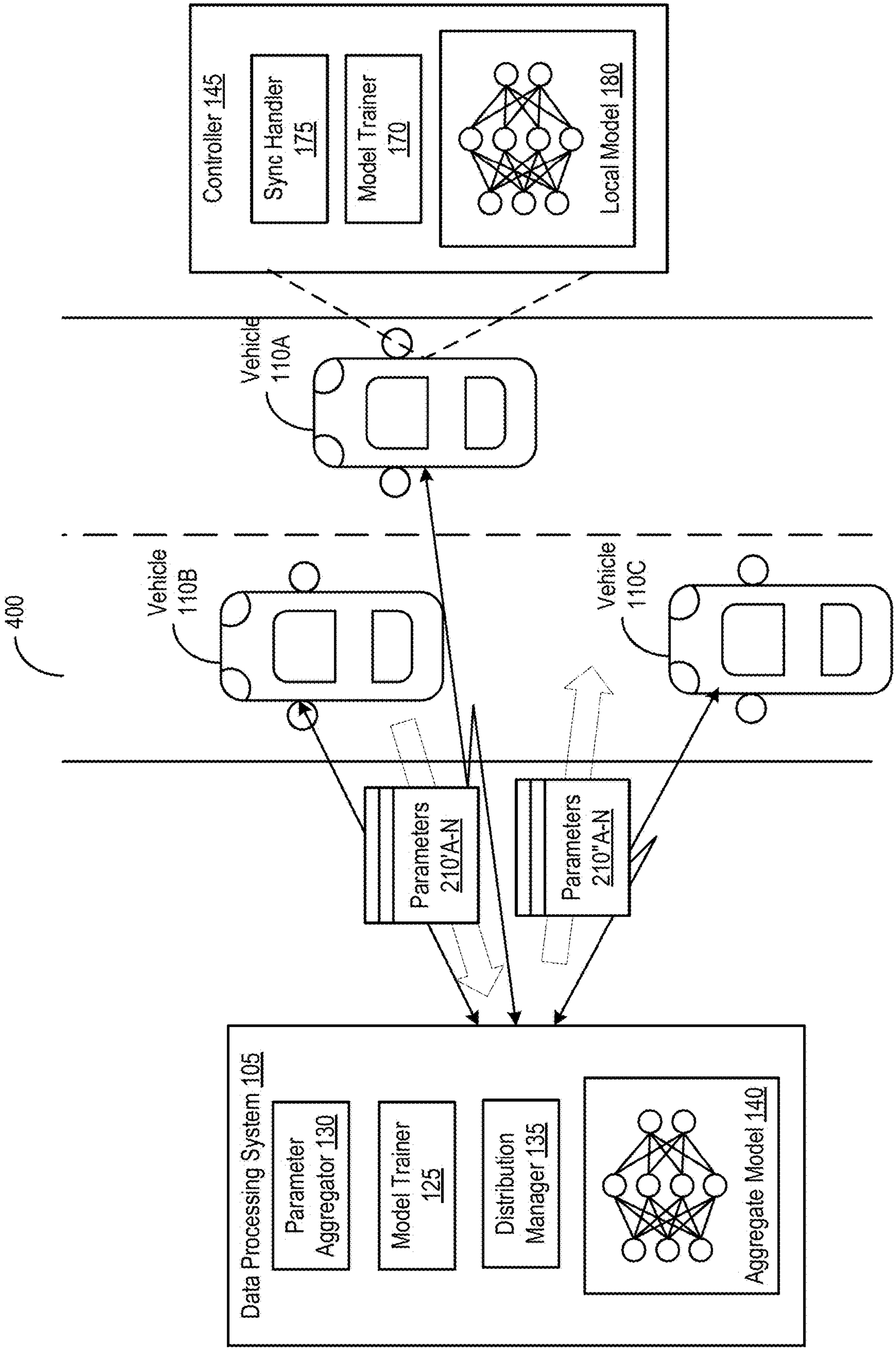
FIG. 4 depicts a block diagram of a process for aggregating local models in the system for performing centralized federated learning across vehicles, in accordance with an illustrative embodiment.

Referring now to FIG. 4, depicted is a block diagram of a process 400 for aggregating local model parameters in the system for performing centralized federated learning across vehicles. The process 400 can include or correspond to operations in the system 100 to aggregate local model parameters and distribute global model parameters to vehicles. Under the process 400, the synchronization handler 175 of the controller 145 on the respective vehicle 110 can provide, send, or otherwise transmit a set of parameters 210'A-N (hereinafter generally referred to as the set of parameters 210') from the local model 180. The set of parameters 210 may have been set or generated by training the local model 180 as discussed above. In some embodiments, the synchronization handler 175 can monitor for establishment of a connection between the controller 145 and the data processing system 105 (e.g., over the network 115). The synchronization handler 175 can attempt to connect with the data processing system 105 via the network 115 in accordance with a schedule, such as at an hourly, daily, or weekly interval. Upon detection of the establishment, the synchronization handler 175 can send the set of parameters 210' to the data processing system 105. In some embodiments, the synchronization handler 175 can send, provide, or transmit compressed data (e.g., quantization, sparsification, lossless compression, or lossy compression) regarding the set of parameters 210' to the data processing system 105 upon establish the connection. The synchronization handler 175 can provide or send an identification of the vehicle function, for which the set of parameters 210' were generated.

The parameter aggregator 130 executing on the data processing system 105 can retrieve, identify, or receive the set of parameters 210' from each respective vehicle 110. In some embodiments, the parameter aggregator 130 can monitor for establishment of a connection between the controller 145 on the respective vehicle 110 and the data processing system 105 (e.g., over the network 115). Upon detection of the establishment, the synchronization handler 175 can fetch or retrieve the set of parameters 210' from the local model 180 of the controller 145 on the respective vehicle 110. The parameter aggregator 130 can receive sets of parameters 210' from multiple vehicles 110, with which the data processing system 105 has established the connection. Upon receipt, the parameter aggregator 130 can identify the vehicle function associated with the set of parameters 210' were generated. After receiving a threshold number of sets of parameters 210', the parameter aggregator 130 can invoke the model trainer 125 to update the aggregate model 140.

The model trainer 125 executing on the data processing system 105 can modify, set, or otherwise update the parameters on the aggregate model 140. In some embodiments, the model trainer 125 can identify or select the aggregate model 140 associated with the vehicle function from the set of aggregate models 180, based on the data included in the set of parameters 210'. For instance, when the set of parameters 210' is for the vehicle function of the battery, the model trainer 125 can select the aggregate model 140 corresponding to the battery vehicle function. The updating of the aggregate model 140 can be in accordance with federated learning. To update, the model trainer 125 can combine sets of parameters 210' associated with the same vehicle function from the vehicles 110. From combining the sets of parameters 210', the model trainer 125 can produce, determine, or otherwise generate a set of parameters 210"A-N (hereinafter generally referred to as the set of parameters 210") to configure the aggregate model 140. The combination may be in accordance with a function (e.g., a weighted sum or average) of the values for each parameter 210' in the aggregate model 140 or local model 180. In some embodiments, the combination can also include the values for the parameters of the aggregate model 140. With the generation, the model trainer 125 can assign or set the values of the parameters in the aggregate model 140 to the parameters 210" generated from the combination. The distribution of the set of parameters 210" can be similar to the distribution of set of parameters 210 as discussed above.

The distribution manager 135 executing on the data processing system 105 can provide, transmit, or otherwise send the set of parameters 210" to the controller 145 on each vehicle 110. The distribution manager 135 can send the set of parameters 210", together with an identification of the vehicle function for which the parameters 210" were generated. In some embodiments, the distribution manager 135 can broadcast the set of parameters 210" to the vehicles 110.

For example, the distribution manager 135 can broadcast the set of parameters 210" in accordance with a schedule, such as at an hourly or weekly interval. In some embodiments, the distribution manager 135 can monitor for establishment of a connection between the controller 145 and the data processing system 105 over the network 115. Upon detecting the establishment of the connection, the distribution manager 135 can transmit the set of parameters 210" to the vehicle 110. For example, the distribution manager 135 can detecting the connection through a communication interface on the data processing system 105 with the controller 145 on the vehicle 110. In some embodiments, the set of parameters 210" can be transmitted among the vehicles 110 upon establishing a connection (e.g., using inter-vehicle (V2X) communications protocols). In some embodiments, the distribution manager 135 can send, provide, or transmit compressed data (e.g., quantization, sparsification, lossless compression, or lossy compression) regarding the set of parameters 210" to the vehicle 110 upon establish the connection.

The synchronization handler 175 of the controller 145 on the vehicle 110 can retrieve, identify, or otherwise receive the set of parameters 210" from the data processing system 105. In some embodiments, the synchronization handler 175 can monitor for an establishment of the connection with the data processing system 105. The synchronization handler 175 can attempt to connect with the data processing system 105 via the network 115 in accordance with a schedule, such as at an hourly, daily, or weekly interval. Upon detection of the establishment, the synchronization handler 175 can fetch or retrieve the set of parameters 210" from the data processing system 105. The synchronization handler 175 can also retrieve, identify, or otherwise receive the identification of the vehicle function for which the parameters 210" were generated. The distribution and receipt of the set of parameters 210" can be in accordance with federated learning techniques.

The model trainer 170 of the controller 145 on the vehicle 110 can re-configure or otherwise update the local model 180 using the set of parameters 210" from the data processing system 105. With receipt from the data processing system 105, the model trainer 170 can set the values of the parameters on the local model 180 to values identified by the set of parameters 210" of the aggregate model 140. In some embodiments, the model trainer 170 can identify the local model 180 associated with the identified vehicle function for which the set of parameters 210" were generated. With the identification, the model trainer 170 can set or assign the values of the local model 180 with the values defined by the set of parameters 210" received from the data processing system 105.

Figure 5:
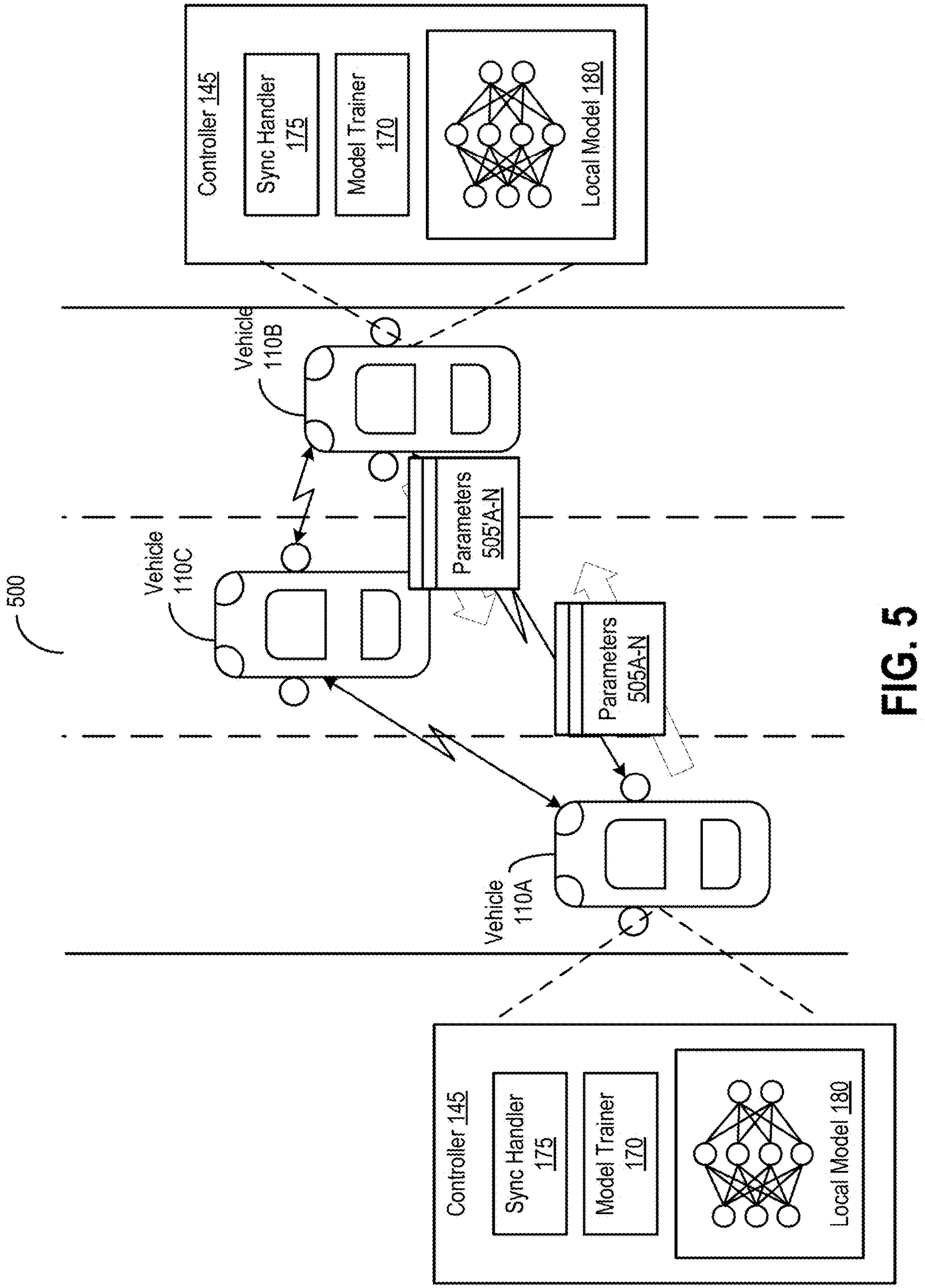
FIG. 5 depicts a block diagram of a process of training local models in the system for performing decentralized federated learning across vehicles, in accordance with an illustrative embodiment.

FIG. 5 depicts a block diagram of a process 500 of training local models in the system for performing decentralized federated learning across vehicles. The process 500 can include or correspond to operations in the system 100 to exchange local model parameters between the vehicles 110A and 110B. Under the process 500, the synchronization handler 175 on the controller 145 of each vehicle 110A and 110B may monitor for establishment of a connection between the controller 145 on each vehicle 110A and 110B. The synchronization handler 175 in one vehicle 110A can attempt to connect with the synchronization handler 175 in the other vehicle 110B based on a distance from each other. For example, the synchronization handler 175 in one vehicle 110A can attempt to connect with the synchronization handler 175 in the other vehicle 110B in accordance with V2V communication protocols, when within 200 m even while traveling through the environment. In some embodiments, the synchronization handler 175 on the vehicle 110A can connect with the other vehicle 110B via one or more other vehicles (e.g., the vehicle 110C) to exchange data.

With the establishment of the connection, the synchronization handler 175 on the controller 145 of the vehicle 110A provide, send, or otherwise transmit a set of parameters 505A-N (hereinafter generally referred to as the set of parameters 505) from the local model 180. The set of parameters 505 can be the parameters 210' as discussed above from training the local model 180 at the vehicle 110A using sensor data. In some embodiments, the synchronization handler 175 on the vehicle 110A can send, provide, or transmit compressed data (e.g., quantization, sparsification, lossless compression, or lossy compression) regarding the set of parameters 505' to the vehicle 110B upon establish the connection. Conversely, the synchronization handler 175 on the controller 145 of the vehicle 110B provide, send, or otherwise transmit a set of parameters 505'A-N (hereinafter generally referred to as the set of parameters 505) from the local model 180. In some embodiments, the synchronization handler 175 can send, provide, or transmit compressed data (e.g., quantization, sparsification, lossless compression, or lossy compression) regarding the set of parameters 505' to the vehicle 110A upon establish the connection. The set of parameters 505 can be the parameters 210' as discussed above from training the local model 180 at the vehicle 110B using sensor data.

The synchronization handler 175 on the vehicle 110A can retrieve, identify, or otherwise receive the set of parameters 505' from the vehicle 110B. The synchronization handler 175 on the vehicle 110B can retrieve, identify, or otherwise receive the set of parameters 505 from the vehicle 110A. In some embodiments, the synchronization handler 175 on one vehicle 110A can transmit the set of parameters 505 or receive the set of parameters 505' via another vehicle (e.g., the vehicle 110C) from the other vehicle 110B. The synchronization handler 175 on one vehicle 110B can transmit the set of parameters 505' or receive the set of parameters 505 via another vehicle (e.g., the vehicle 110C) from the other vehicle 110A The model trainer 170 of the controller 145 on each vehicle 110A and 110B can re-configure or otherwise update the local model 180 using the set of parameters 505 and 505'. The model trainer 170 on the vehicle 110A can update the local model 180 using the set of parameters 505' from the vehicle 110B. Conversely, the model trainer 170 on the vehicle 110B can update the local model 180 using the set of parameters 505 from the vehicle 110A. With receipt, the model trainer 170 on the vehicle 110A can set the values of the parameters on the local model 180 to values identified by the set of parameters 505' from the vehicle 110B. Likewise, the model trainer 170 on the vehicle 110B can set the values of the parameters on the local model 180 to values identified by the set of parameters 505 from the vehicle 110A.

In some embodiments, the model trainer 170 on at least one of the vehicles 110 (e.g., the vehicle 110A) can initialize, train, and establish the instance of the local model 180. The initialization can be performed by the model trainer 170 using a training dataset (e.g., similar to the training dataset 205), prior to or in at least partial conjunction with the establishment of the connection. The training dataset may be pre-installed or stored on the controller 145 of the vehicle 110 or may be retrieved from the other vehicle 110 (e.g., the vehicle 110B). In some embodiments, the model trainer 170 on one vehicle 110A can initialize, train, and establish the local model 180 using the set of parameters 505' from the other vehicle 110B.

In some embodiments, the model trainer 170 can calculate, generate, or otherwise generate combine sets of parameters 505 and 505' associated with the same vehicle function. From combining the sets of parameters 505 and 505', the model trainer 125 can produce, determine, or otherwise generate a set of parameters to configure the instance of the local model 180. The combination may be in accordance with a function (e.g., a weighted sum or average) of the values for each parameter 505 and 505' in the local model 180. In some embodiments, the combination can also include the values for the parameters of the instance of the local model 180. With the generation, the model trainer 125 can assign or set the values of the parameters in the local model 180 to the parameters generated from the combination.

In some embodiments, the model trainer 170 on the vehicle 110A can select or identify the local model 180 associated with the identified vehicle function for which the set of parameters 505' received from the vehicle 110B. With the identification, the model trainer 170 can set or assign the values of the local model 180 with the values defined by the set of parameters 505'. In addition, the model trainer 170 on the vehicle 110B can identify the local model 180 associated with the identified vehicle function for which the set of parameters 505 received from the vehicle 110A. With the identification, the model trainer 170 can set or assign the values of the local model 180 with the values defined by the set of parameters 505.

Figure 6:
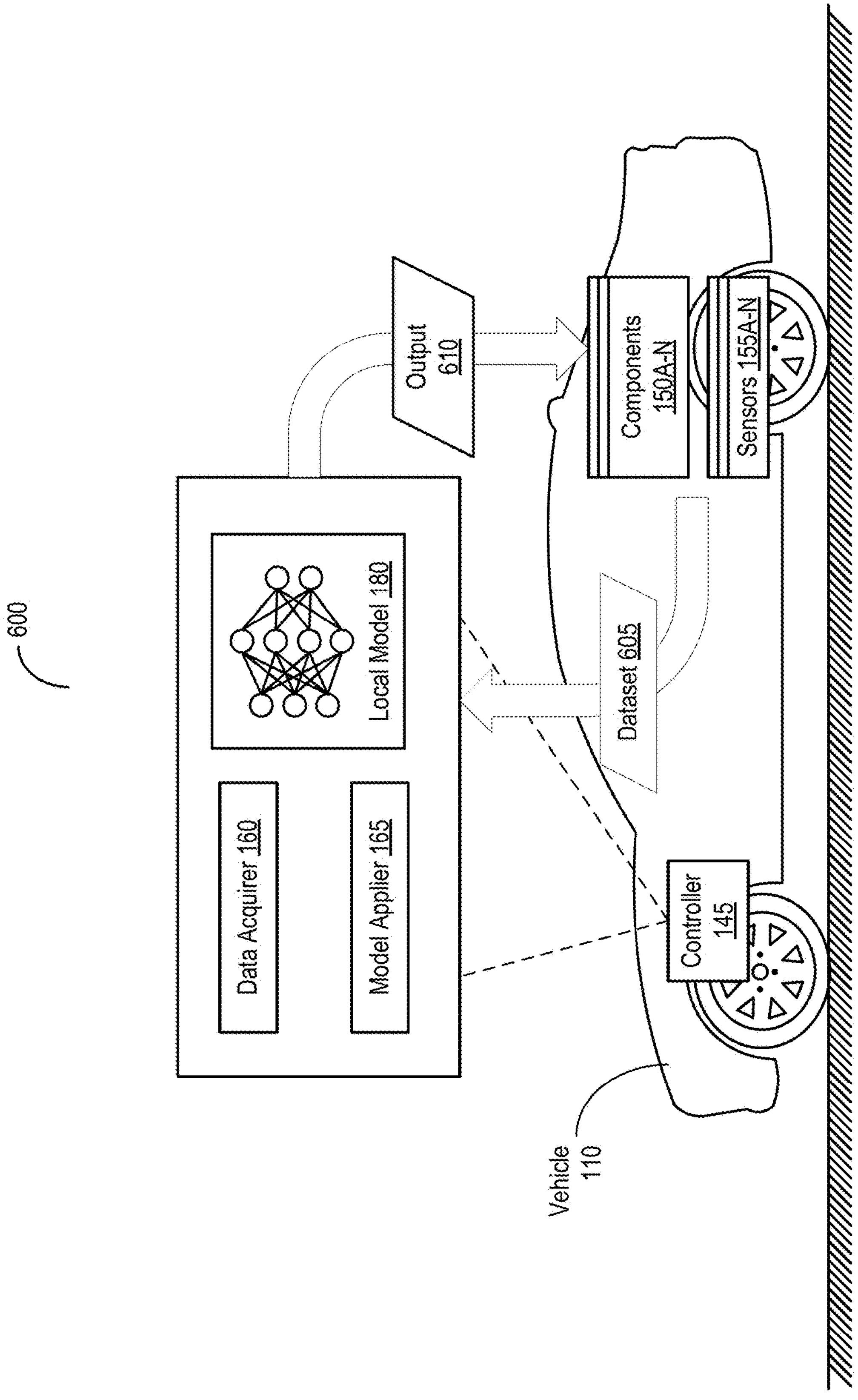
FIG. 6 depicts a block diagram of a process of using local models to control vehicle functionality in the system for performing federated learning across vehicles, in accordance with an illustrative embodiment.

Referring now to FIG. 6, depicted is a block diagram of a process 600 of using local models to control vehicle functionality in the system 100 for performing federated learning across vehicles. The process 300 can include or correspond to operations in the system 100 to use the local instance of the model to control various vehicle functionality. With the establishment and updating of the local model 180 (e.g., using the process 400 or 500), the controller 145 on the vehicle 110 may use the local model 180 to generate outputs to control components 150 in the vehicle 110. Under the process 600, the data acquirer 160 of the controller 145 on the vehicle 110 can retrieve, receive, or otherwise identify at least one dataset 605 (sometimes herein referred to generally as data) from one or more sensors 155. The dataset 605 can include measurements for the vehicle function for which the local model 180 is to generated outputs. For instance, when the vehicle function is for the propulsion system, the dataset 605 can identify engine speed, engine torque, user inputs (e.g., steering, accelerator, or break input), as acquired by the sensors 155. In some embodiments, the data acquirer 160 can retrieve, receive, or otherwise identify at least one measured value for the vehicle function. The measured value can define or identify a characteristic of the vehicle function.

The model applier 165 can feed or apply the dataset 605 received from the sensors 155 to the local model 180. In some embodiments, the model applier 165 can identify the local model 180 associated with the vehicle function to which to feed the dataset 605. In some embodiments, the model applier 165 (and model trainer 170) can wait or delay the application of the dataset 605 until the processors on the controller 145 are idle or free from performing other operations for the vehicle 110. In applying, the model applier 165 can process the dataset 605 in accordance with the parameters of the local model 180. From processing, the model applier 165 can produce, output, or otherwise generate at least one output 610 for the vehicle function.

The output 610 may define or identify a vehicle function action for the vehicle function. The output 610 can include a command signal to configure, set, or otherwise or adjust the operations of the one or more components 150 associated with the vehicle function. The command signal may define, specify, or otherwise one or more vehicle function actions to be performed by the components 150 associated with the vehicle function. For instance, when the vehicle function is for the cruise control system, the output 610 may be a command signal to set a target speed for the vehicle propulsion system factoring in the measurements. When the vehicle function is for an aftertreatment system, the output 610 may specify a command to activate dosing control to inject a diesel exhaust fluid into the exhaust stream. When the vehicle system is for a thermal management system, the output 610 may include a control signal to set the exhaust temperature to specified temperature. In some embodiments, the output 610 may include data (e.g., in the form of estimated value) to be used to derive the command signal.

With the generation of the output 610, the controller 145 may convey, transmit, or otherwise send the output 610 to the one or more components 150 associated with the vehicle function. By sending the output 610, the controller 145 may cause the one or more components 150 to carry out, perform, or otherwise execute the vehicle function action in accordance with the output 610. Upon receipt, the component 150 may carry out, perform, or otherwise execute the vehicle function action in accordance with the command signal of the output 610. For example, the output 610 may be for the components 150 forming the battery management system in the vehicle 110, and may include a command signal to specify an amount of power drawn from the batteries. With receipt of the output 601, the components 150 of the battery management system can adjust the output power drawn from the batteries to the specified amount. As new datasets 605 are retrieved from the sensors 155, the controller 145 may use the local model 180 to generate and provide new outputs 610 to handle, manage, or otherwise control the vehicle function.

In this manner, the system 100 can provide for federated learning to facilitate aggregation and distribution of parameters (e.g., the set of parameters 210, 210', and 210") learned from training instance of the machine learning models (e.g., the aggregation model 1440 and the local model 180). This can account for the limitations to processing power and memory constraints on the controller 145 on each respective vehicle 110 to establish and train such models entirely by itself, without the assistance of other controllers 145 or the data processing system 105. By using federated learning (centralized or decentralized), the controller 145 on each vehicle 110 may train the local model 180 to control and determine various characteristics of vehicle functions, such as battery life, battery health, engine control, engine emission, autonomous vehicle functions, vehicle diagnostics, and prognostics, among others.

Figure 7:
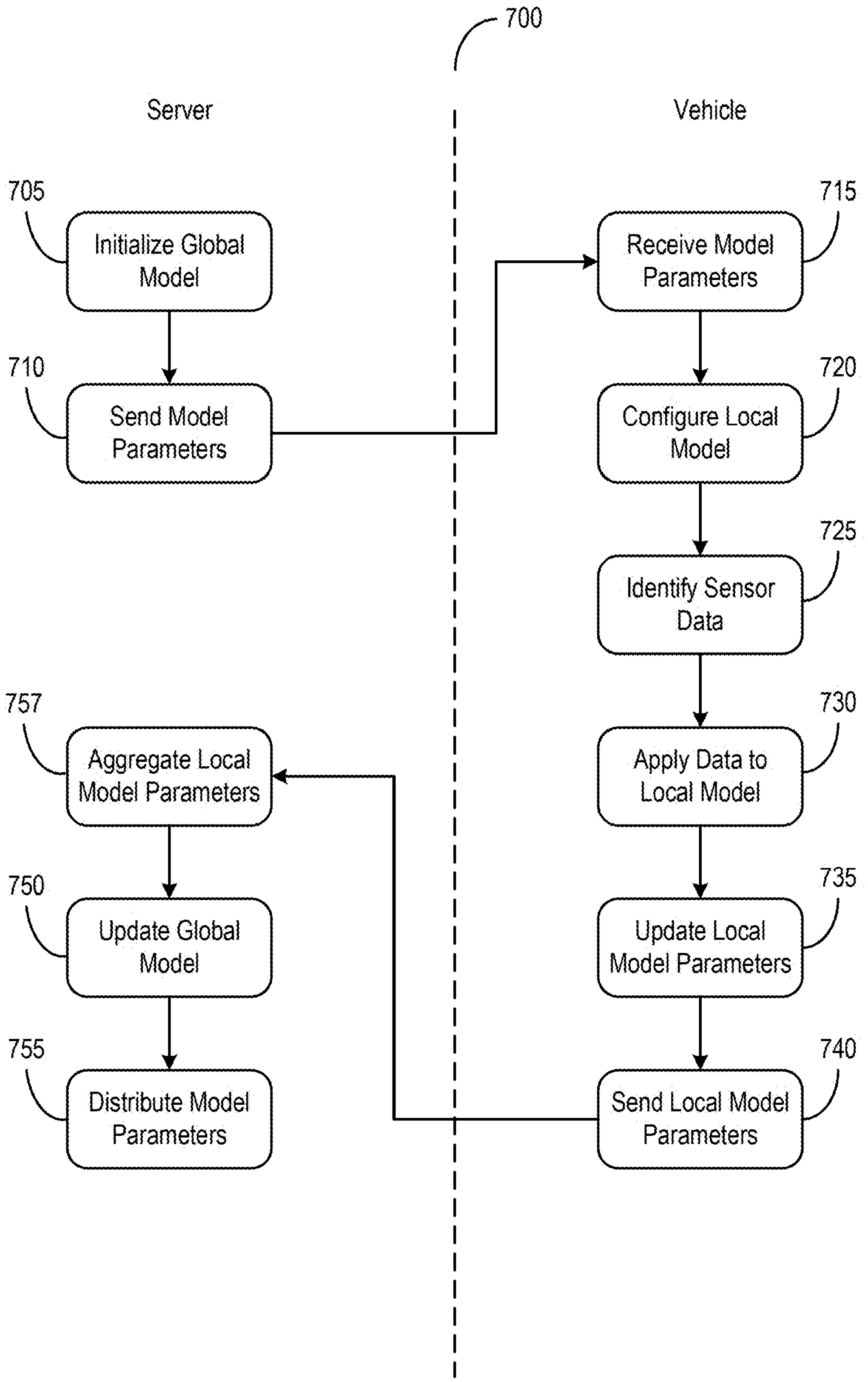
FIG. 7 depicts a flow diagram of a method of performing centralized federated learning across vehicles, in accordance with an illustrative embodiment.

Referring now to FIG. 7, depicted is a flow diagram of a method 700 of performing federated centralized learning across vehicles. The method 700 can be implemented or performed using any of the component described herein, such as the data processing system 105 and the controller 145 of the vehicle 110. In brief overview, under the method 700, a server can initialize a global model (705). The server can send model parameters from the global model to a vehicle (710). The vehicle can receive the model parameters from the server (715). The vehicle can configure the local model using the received model parameters (720). The vehicle can identify sensor data for a vehicle function (725). The vehicle can apply to the local model to generate a value (730). The vehicle can update the local model parameters based on the application of the local model (735). The vehicle can send the local model parameters to the server (740). The server can receive and aggregate local model parameters (745). The server can update the global model using the aggregated parameters (750). The server can distribute model parameters (755).

In further detail, a server (e.g., the data processing system 105) can initialize, train, or otherwise establish a global model (e.g., the aggregate model 140) (705). The server can establish the global model using training data. The training data may include a set of examples for a particular vehicle function. Each example can identify or include a sample input dataset (e.g., sensor measurement data) and an expected output value associated with the vehicle function. The vehicle function may include, for example, a battery, a dosing control, an aftertreatment system, a nitrogen oxide (NOx) emission, advanced diesel electric power train, an advanced drive-assistance system, a vehicle diagnostic system, a vehicle diagnostic system, a vehicle prognostic system, or an engine system, among others. The server can train the global model in accordance with supervised learning techniques, weakly supervised or unsupervised learning techniques, among others. In some embodiments, the server can establish the global model using parameters from instances of local models (e.g., the local model 180).

The server can provide, transmit, or otherwise send model parameters (e.g., the set of parameter 210) from the global model to a vehicle (e.g., the controller 145 of the controller 145) (710). From training the global model using the training dataset (or data from other instances of local models), the server can iteratively update the model parameters of the global model. The global model may learn to detect latent features in the training dataset related to the expected output. During each update, the server may determine a loss metric between the output from the global model with the expected output from the training data. In some embodiments, the server can send the model parameters, upon establishing a connection with the vehicle. The vehicle (e.g., the controller 145) can retrieve, identify, or otherwise receive the model parameters of the global model from the server (715). In some embodiments, the vehicle can retrieve the model parameters from the server, in response to establishing communications with the server.

The vehicle can update, set, or otherwise configure the local model using the received model parameters received from the server (720). The vehicle may initialize, train, and establish the local model using the model parameters. With the receipt of the model parameters of the global model from the server, the vehicle may set or assign the model parameters of the local model to the values of the model parameters of the global model. In some embodiments, the vehicle may identify or select the local model associated with the same vehicle function as the global model, as identified in the model parameters. The vehicle can retrieve, obtain, or otherwise identify sensor data for the vehicle function (725). The vehicle may identify the sensor data (e.g., the dataset 305) from one or more sensors (e.g., the sensors 155) associated with the vehicle function. In some embodiments, the vehicle can retrieve, obtain, or otherwise identify measured values (e.g., the measured values 310) associated with the vehicle function from the one or more sensors. The sensor data and measured values from the sensors The vehicle can feed or apply to the local model to the sensor data to output, produce, or otherwise generate at least one value (e.g., the estimated value 310') (730). In applying, the vehicle can process the sensor data in accordance with the local model parameters of the local model. From processing the sensor data, the vehicle can generate the value associated with the vehicle function. The vehicle can set, configure, or otherwise update the local model parameters based on the application of the local model (735). The vehicle can calculate, generate, or otherwise determine a loss metric by comparing the value from the local model with the measured values from the one or more sensors. Using the loss metric, the vehicle can adjust or modify the local model parameters. The updating of the local model parameters be in accordance with accordance with an optimization function (e.g., with a set learning rate, a momentum, weight decay, and momentum) for the local model.

The vehicle can transmit, provide, or otherwise send the local model parameters from the local model to the server (740). The vehicle can send the local model parameters, upon establishing a connection with the server. In some embodiments, the vehicle can send the local model parameters with an identification of the vehicle function associated with the local model parameters. The server can receive, retrieve, or otherwise aggregate local model parameters from one or more vehicles (e.g., the vehicles 110) (745). The server can retrieve the local model parameters, upon establishing a connection with the vehicle. Each set of local model parameters may be retrieved from a corresponding vehicle.

The server can re-configure, or update the global model using the aggregated parameters (750). With the receipt of the local model parameters from the one or more vehicles, the server may set or assign the model parameters of the global model to the values of the local model parameters. In some embodiments, the server may update the global model, upon collecting a threshold number of sets of local model parameters from vehicles. In some embodiments, the server may combine the sets of local model parameters in accordance with a function (e.g., an average or a weighted sum). The server can broadcast, transmit, or otherwise distribute the model parameters from the global model to the one or more vehicles (755). With the updating of the global model, the server can send the model parameters from the global model to each vehicle. The server can send the model parameters of the global model to the vehicle, upon establish communications with the vehicle.

Figure 8:
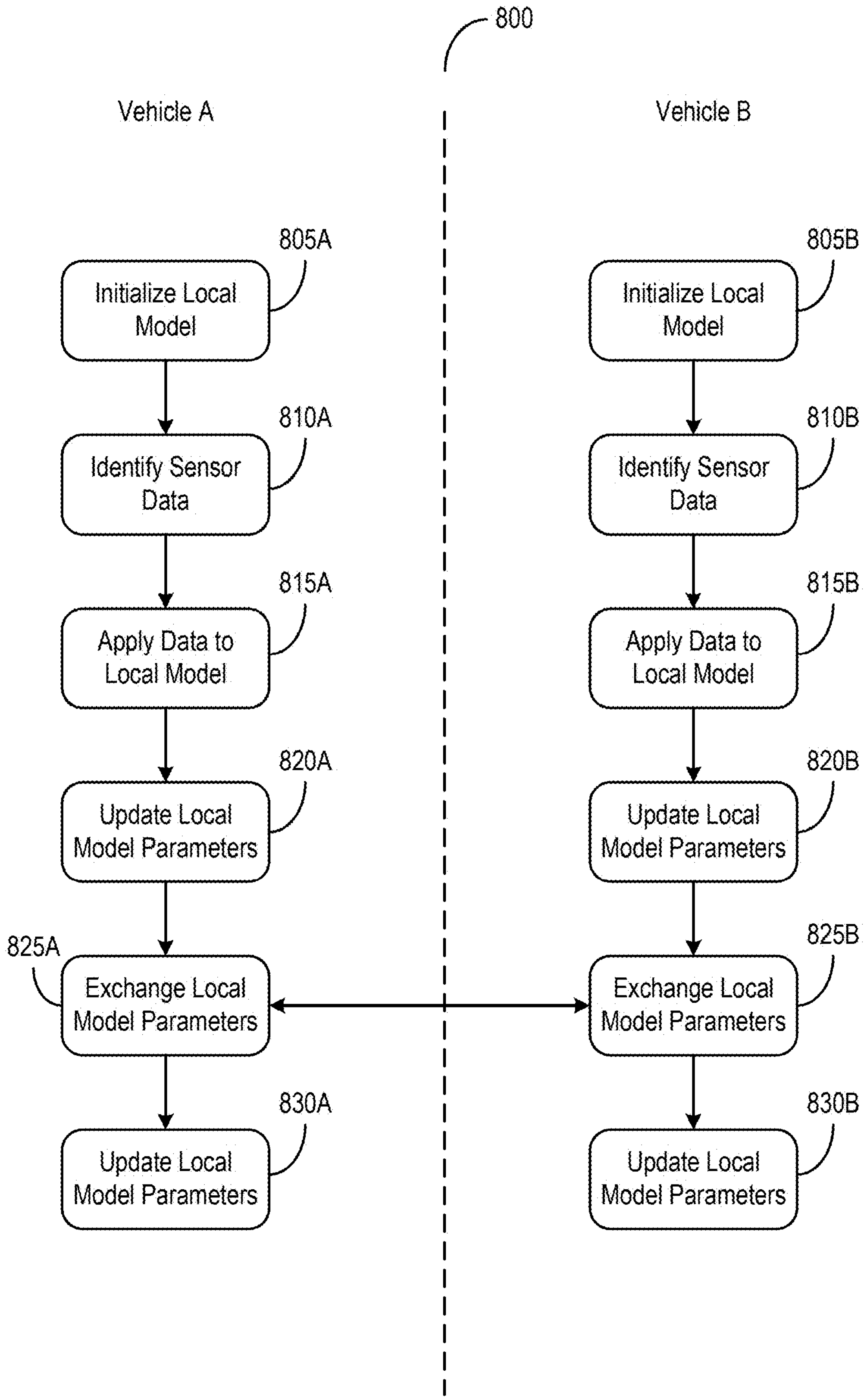
FIG. 8 depicts a flow diagram of a method of performing decentralized federated learning across vehicles, in accordance with an illustrative embodiment.

Referring now to FIG. 8, depicted is a flow diagram of a method 800 of performing decentralized federated learning across vehicles. The method 800 can be implemented or performed using any of the component described herein, such as the controller 145 of the vehicle 110. In brief overview, under the method 800, a controller in each vehicle A and B may initialize a local model (805A and 805B). The controller in each vehicle may identify sensor data (810A and 810B). The controller in each vehicle may apply the sensor data to a local model (815A and 815B). The controller in each vehicle may update the local model parameters (820A and 820B). The controller in each vehicle may exchange local model parameters (825A and 825B). The controller in each vehicle may update the local model parameters (830A and 830B).

In further detail, a controller (e.g., the controller 145) in each vehicle A and B (e.g., the vehicles 110A and 110B) may train, establish, or otherwise initialize a local model (e.g., the local model 180) (805A and 805B). The controller can establish the local model using training data. The training data may include a set of examples for a particular vehicle function. Each example can identify or include a sample input dataset (e.g., sensor measurement data) and an expected output value associated with the vehicle function. The vehicle function may include, for example, a battery, a dosing control, an aftertreatment system, a nitrogen oxide (NOx) emission, advanced diesel electric power train, an advanced drive-assistance system, a vehicle diagnostic system, a vehicle diagnostic system, a vehicle prognostic system, or an engine system, among others. The controller can train the local model in accordance with supervised learning techniques, weakly supervised or unsupervised learning techniques, among others. In some embodiments, the controller can establish the local model using parameters from other instances of local models (e.g., on the other vehicle).

The controller in each vehicle may retrieve, obtain, or otherwise identify sensor data (810A and 810B). The controller may identify the sensor data (e.g., the dataset 305) from one or more sensors (e.g., the sensors 155) associated with the vehicle function. In some embodiments, the controller can retrieve, obtain, or otherwise identify measured values (e.g., the measured values 310) associated with the vehicle function from the one or more sensors. The sensor data and measured values from the sensors. The controller in each vehicle may feed or apply the sensor data to the local model (815A and 815B). In applying, the vehicle can process the sensor data in accordance with the local model parameters of the local model. From processing the sensor data, the vehicle can generate an estimated value (e.g., the estimated value 310') associated with the vehicle function.

The controller in each vehicle may configure, set, or otherwise update the local model parameters of the local model (820A and 820B). To update, the controller may calculate, generate, or otherwise determine a loss metric by comparing the value from the local model with the measured values from the one or more sensors. Using the loss metric, the controller may adjust or modify the local model parameters. The updating of the local model parameters be in accordance with accordance with an optimization function (e.g., with a set learning rate, a momentum, weight decay, and momentum) for the local model.

The controller in each vehicle may communicate or exchange local model parameters with each other (825A and 825B). The controller on one vehicle may monitor for an establishment of a connection with another vehicle. Upon establishment of communications with the other vehicle, the controller may provide, transmit, or otherwise send the local model parameters from the local model. Conversely, the controller can retrieve, obtain, or otherwise identify the local model parameters from the instance of the local model on the other vehicle. The controller in each vehicle may reconfigure, set, or otherwise update the local model parameters (830A and 830B). With the exchanging of the local model parameters, the controller may set or assign he model parameters of the local model to the received values of the local model parameters. In some embodiments, the server may combine the sets of local model parameters in accordance with a function (e.g., an average or a weighted sum). With the combination, the controller can set or assign the local model parameters to the combined values.

For the purposes of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in the figures, it should be understood that the components may include any number of circuits for completing the functions described herein. For example, the activities and functionalities of the circuits of the charge management system may be combined in multiple circuits or as a single circuit. Additional circuits with additional functionality may also be included. Further, the controller may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for performing federated learning across vehicles, comprising:

a first computing device having one or more processors coupled with memory, the first computing device configured to:

maintain, in the memory, a first machine learning (ML) model comprising a first plurality of parameters for determining values identifying a characteristic of a vehicle function on at least one of a plurality of vehicles;

receive, from each respective vehicle of the plurality of vehicles, a second plurality of parameters generated by a second ML model used by a second computing device on each respective vehicle using (i) data associated with the vehicle function acquired via at least one sensor and (ii) a value identifying the characteristic of the vehicle function on the respective vehicle;

update the first plurality of parameters of the first ML model in accordance with the second plurality of parameters received from each respective vehicle of the plurality of vehicles; and transmit, to at least one vehicle of the plurality of vehicles, an identifier corresponding the vehicle function and the updated first plurality of parameters to update the second plurality of parameters of the second ML model on the at least one vehicle.

2. The system of claim 1, wherein the first computing device is further configured to retrieve, responsive to establishing a connection with at least one vehicle of the plurality of vehicles, the second plurality of parameters of the second ML model on the at least one vehicle, wherein the second plurality of parameters are generated on the at least one vehicle while no connection was established with the first computing device.

3. The system of claim 1, wherein the first computing device is further configured to initialize the first ML model using a third plurality of parameters generated by a third ML model maintained on at least one server.

4. The system of claim 1, wherein the first computing device is further configured to identify, from a plurality of ML models, the first ML model based on the vehicle function.

5. The system of claim 1, wherein the first computing device is further configured to:

generate an output using the first ML model that identifies a vehicle function action; and cause, in accordance with the output, one or more components associated with the vehicle function action to execute the vehicle function action.

6. The system of claim 1, wherein the vehicle function comprises at least one of: a battery management function to control output from a battery, a dosing control function of an aftertreatment system to control an injection of reductant in the aftertreatment system, an engine control function, a hybrid control function to control a switching between electric motor and fuel-based engine, an advanced drive assistance system function to control operation of vehicle movement, a vehicle diagnostic function to detect faults in the vehicle, or a vehicle prognostic function to predict faults in the vehicle.

7. A vehicle system, comprising:

a component configured to perform a vehicle system function; and at least one processing circuit including one or more processors coupled with memory, the at least one processing circuit configured to:

maintain a first machine learning (ML) model comprising a first plurality of parameters for determining values associated with the vehicle system function;

identify data associated with the vehicle system function and a first value identifying a characteristic of the vehicle system function;

generate a second value identifying the characteristic of the vehicle system function using the first ML model;

update the first plurality of parameters of the first ML model based on a comparison between the first value and the second value; and transmit an identifier corresponding the vehicle system function and the updated first plurality of parameters from the ML model to at least one computing device remote from the at least one processing circuit to update a second plurality of parameters of a second ML model maintained by the at least one computing device.

8. The vehicle system of claim 7, wherein the at least one processing circuit is further configured to:

receive, from the at least one computing device, a second plurality of parameters of the second ML model, the second plurality of parameters generated by the at least one computing device using the first plurality of parameters and a third plurality of parameters received from each respective vehicle system of a plurality of vehicle systems;

identify, from a plurality of ML models, the first ML model based on the vehicle system function; and update the first plurality of parameters of the first ML model using the third plurality of parameters.

9. The vehicle system of claim 7, wherein the at least one processing circuit is further configured to transmit compressed data regarding the first plurality of parameters to the at least one computing device in response to establishment of a connection with the at least one computing device.

10. The vehicle system of claim 7, wherein the at least one processing circuit is further configured to initialize the first ML model using the second plurality of parameters received from the second ML model of the at least one computing device remote from the at least one processing circuit.

11. The vehicle system of claim 7, wherein the at least one computing device is at least one server, and wherein the at least one processing circuit is further configured to transmit the first plurality of parameters to the at least one server to update a third ML model on the at least one server using the first plurality of parameters and a respective second plurality of parameters from each respective vehicle system of a plurality of vehicle systems.

12. The vehicle system of claim 7, wherein the at least one computing device is an on-board vehicle computing device, and wherein the at least one processing circuit is further configured to transmit the first plurality of parameters to the on-board vehicle computing device to update the second ML model using the first plurality of parameters.

13. The vehicle system of claim 7 wherein the at least one processing circuit is further configured to:

generate an output using the first ML model that identifies a vehicle function action; and cause, in accordance with the output, one or more components associated with the vehicle function action to execute the vehicle function action.

14. A method of performing federated learning across vehicles, the method comprising:

maintaining, by a first computing system, a first machine learning (ML) model comprising a first plurality of parameters for determining values associated with a vehicle function of at least one of a plurality of vehicles;

receiving, by the first computing system and from each respective vehicle of the plurality of vehicles, a second plurality of parameters generated by a second ML model used by a second computing system on each respective vehicle;

updating, by the first computing system, the first plurality of parameters of the first ML model in accordance with the second plurality of parameters received from each respective vehicle of the plurality of vehicles; and transmitting, by the first computing system and to at least one vehicle of the plurality of vehicles, an identifier corresponding the vehicle function and the updated first plurality of parameters to cause a second computing system on the at least one vehicle to update the second plurality of parameters of the second ML model on the at least one vehicle.

15. The method of claim 14, wherein receiving the second plurality of parameters further comprises retrieving, by the first computing system and responsive to establishing a connection with at least one vehicle of the plurality of vehicles, the second plurality of parameters of the second ML model on the at least one vehicle, wherein the second plurality of parameters are generated on the at least one vehicle while no connection was established with the first computing system.

16. The method of claim 14, further comprising initializing, by the first computing system, the first ML model using a third plurality of parameters generated by a third ML model maintained on at least one server.

17. The method of claim 14, further comprising identifying, by the first computing system, the first ML model from a plurality of ML models based on the vehicle function.

18. The method of claim 14, further comprising:

generating, by the first computing system, an output using the first ML model that identifies a vehicle function action; and causing, by the first computing system, in accordance with the output, one or more components associated with the vehicle function action to execute the vehicle function action.

* * * * *